United States Patent
Seung-Kyu (10) Patent No.: US 6,581,984 B1
(45) Date of Patent: Jun. 24, 2003

(54) CORRUGATED SPIRAL PIPE WITH A COUPLING DEVICE AND METHOD FOR INSTALLING THE SAME

(75) Inventor: Yoon Seung-Kyu, Jeonrabook-do (KR)

(73) Assignee: Seongho CSP, Ltd., Jeonrabook-do (KR)

( * ) Notice: Subject to any disclaimer, the term of this patent is extended or adjusted under 35 U.S.C. 154(b) by 0 days.

(21) Appl. No.: 09/406,481

(22) Filed: Sep. 27, 1999

(51) Int. Cl.[7] ................................................ F16L 19/00
(52) U.S. Cl. ........................ 285/903; 285/368; 285/412
(58) Field of Search ............................... 285/903, 414, 285/415, 368, 412

(56) References Cited

U.S. PATENT DOCUMENTS

| 640,183 A | * | 1/1900 | Dresser | 285/368 |
| 659,888 A | * | 10/1900 | Dresser | 285/368 |
| 2,438,472 A | * | 3/1948 | Calcott | 285/903 X |
| 3,708,187 A | * | 1/1973 | Campbell | 285/903 X |
| 4,174,985 A | * | 11/1979 | Buidry | 285/903 X |
| 4,976,289 A | * | 12/1990 | Umemori et al. | 138/122 |
| 5,429,397 A | * | 7/1995 | Kanao | 285/368 X |
| 5,460,852 A | * | 10/1995 | Janicki et al. | 427/235 |
| 5,758,693 A | * | 6/1998 | Caine | 285/903 X |
| 5,944,362 A | * | 8/1999 | Harle | 285/903 X |

FOREIGN PATENT DOCUMENTS

| DE | 3610947 | * | 8/1987 | 285/903 X |
| JP | 51094460 | * | 8/1976 | 138/144 X |
| JP | 01283495 | * | 11/1989 | 285/903 X |
| JP | 02008587 | * | 1/1990 | 285/903 X |
| JP | 02008588 | * | 1/1990 | 285/903 X |
| JP | 03199797 | * | 8/1991 | 285/903 X |
| KR | 89-5305 | | 12/1989 | |

* cited by examiner

Primary Examiner—Lynne H. Browne
Assistant Examiner—David E. Bochna
(74) Attorney, Agent, or Firm—Thomas R. Vigil; Welsh & Katz, Ltd.

(57) ABSTRACT

A corrugated spiral pipe with a coupling device comprises a pipe body 10, a pair of flanges 20, and a pair of binding bands 30. The pipe body 10 has a cylindrical shape and is prepared to have a spirally corrugated shape 11. The pair of the flanges 20 are formed in one body of outer circumferences of both end portions of said pipe body 10, each of the flanges 20 having a large outer diameter portion at an end portion of the flange 20 and a small outer diameter portion 21 at a longitudinally inside portion of the flange 20. Each of said binding bands 30 is installed on the small outer diameter portion 21 of the flange 20 and is composed of a metallic belt plate 31 which has a ring configuration in which some part thereof is cut, a plurality of connecting rings 32 which are installed axially on an outer surface of the metallic belt plate 31 at specific intervals, and bearing plates 33 which are formed vertically to both end portions of the cut part of the metallic belt plate 31, each of the bearing plates 33 having a hole.

5 Claims, 7 Drawing Sheets

FIG. 6D

CORRUGATED SPIRAL PIPE WITH A COUPLING DEVICE AND METHOD FOR INSTALLING THE SAME

FIELD OF THE INVENTION

The present invention relates to a corrugated spiral pipe for the use of a drainage, which is buried under the ground in order to drain sewage. More particularly, the present invention relates to a corrugated spiral pipe being equipped with a coupling device and a method for installing the same, which provides an excellent connection of the corrugated spiral pipes each other, so that the joint thereof is watertightly coupled with the pipe end of the corrugated spiral pipes.

BACKGROUND OF THE INVENTION

A spiral pipe has been widely used as a drainage in order to drain sewage, which is buried under the ground. A conventional spiral pipe has a spirally corrugated shape, and the structural strength thereof is good against load and impact. But, a watertightness of the connected spiral pipes is poor due to the connecting method.

In order to improve a watertightness of the spiral pipe, a various structure and method have been developed. One of the typical examples is disclosed in Korean Patent Publication No. 89-5305. The above patent relates to a corrugated spiral pipe which is formed of synthetic resin, and has a corrugated shape on the outer surface thereof, and has a flange portion formed in the pipe end of the spiral pipe, in which the outer diameter of the flange is bigger than that of the spiral pipe. And a plurality of holes are formed around the perimeter of the flange of the spiral pipe, and then two spiral pipes are connected by means of a bolt and nut. The flange portion of the spiral pipe is formed in one body with the pipe body, and also a portion of the pipe end of a corrugated spiral pipe is fitted into the flange portion and then a synthetic resin material is used to tightly seal a space between the flange portion and the corrugated spiral pipe. There is an advantage that the corrugated spiral pipes are easily connected.

But, such a conventional corrugated spiral pipe having synthetic resin flange has a shortcoming in the point that the flange portion of both sides of the corrugated spiral pipes is pressed and connected by means of inserting a bolt into the hole formed through the flange portion, then using a nut to tighten up, so that the connected state of the corrugated pipes is not steady, and also the watertightness thereof is poor. More specifically, first, a synthetic resin flange is connected by using a bolt and nut, which can only tighten up sectionally around the bolt, so that a portion besides the tightened portion has a poor adhesion by which a gap is occurred, and also a watertightness can be decreased. Second, when an uneven settlement occurs in the ground, the buried pipes can be easily damaged, by which the flange portion is easily deformed and damaged, therefore a leakage of water occurs. Third, the flange portion having a bigger diameter should be formed and protruded to make a hole thereon, therefore the structural resistance against impact and soil pressure is weak.

Objects of the Invention

An object of the present invention is to provide a corrugated spiral pipe with a coupling device and method for installing the same which can improve a watertightness by means of connecting flange portions of spiral pipes with a binding band, and can maintain an excellent adhesion between the flange portions of the spiral pipes and a firm connection thereof regardless of the effect by the uneven settlement, etc.

Another object of the present invention is to provide a corrugated spiral pipe with a coupling device and method for installing the same which can improve a structural strength against impact and load by forming the height of the flange portion to the minimum.

These and other objects will appear upon reading the following specification and claims and upon considering in connection therewith the attached drawing to which they relate.

SUMMARY OF THE INVENTION

The present invention relates to a corrugated spiral pipe with a coupling device and method for installing the same, which has an excellent connection and an excellent watertightness of the joint.

A corrugated spiral pipe with a coupling device comprises a pipe body 10 which has a cylindrical shape and is prepared to have a spirally corrugated shape 11; a pair of flanges 20 which are formed in one body on outer circumferences of both end portions of said pipe body 10, each of the flanges 20 having a large outer diameter portion at an end portion of the flange 20 and a small outer diameter portion 21 at a longitudinally inside portion of the flange 20; and a pair of binding bands 30, each of said binding bands 30 being installed on the small outer diameter portion 21 of the flange 20 and being composed of a metallic belt plate 31 which has a ring configuration in which some part thereof is cut, a plurality of connecting rings 32 which are installed axially on an outer surface of the metallic belt plate 31 at specific intervals, and bearing plates 33 which are formed vertically to both end portions of the cut part of the metallic belt plate 31, each of the bearing plates 33 having a hole.

A method for installing a corrugated spiral pipe with a coupling device in accordance with the present invention comprises the steps of installing a binding band 30 on a projection 21 of flange 20 of both sides of a corrugated spiral pipe 1 prior to moving it to the construction site; moving said corrugated spiral pipe 1 being equipped with the binding band to the construction site, and aligning in a row; and placing the flange portion 20 of two adjacent pipes 1 to be faced, in which the connecting rings of each binding band 30 are installed to fit each other, and bolts 35 are inserted through the connecting ring 32 of each binding band 30, followed by tightening the bolts with nuts.

BRIEF DESCRIPTION OF THE DRAWINGS

In the drawing in which a preferred embodiment of the present invention is disclosed:

FIG. 5 shows a modified binding band, (a) is a perspective view of bearing plate including a reinforcing plate, (b) is a cross-sectional view of bearing plate including a reinforcing plate.

DETAILED DESCRIPTION OF THE INVENTION

Figure 1:
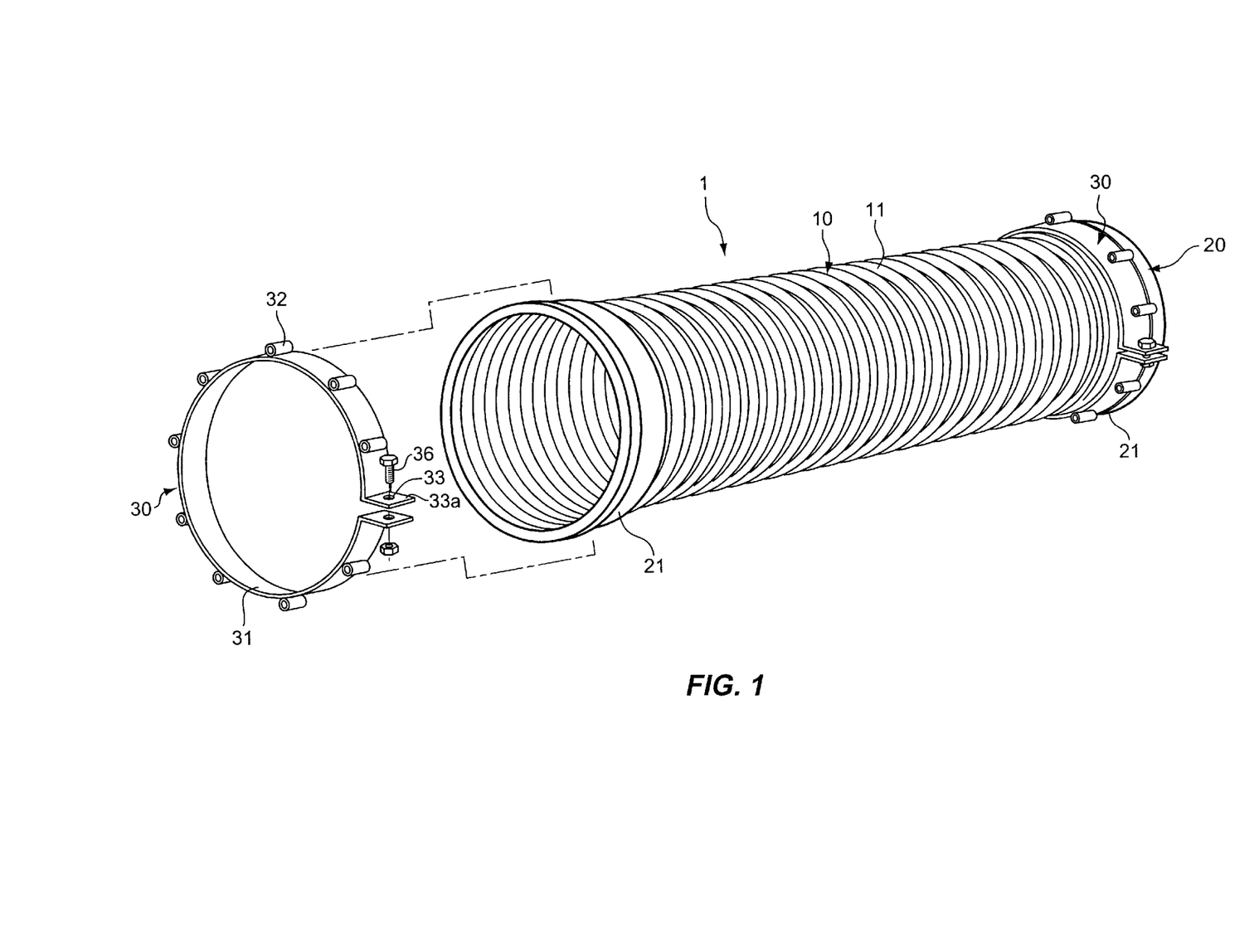
FIG. 1 is a perspective view of a separated spiral pipe according to the present invention.
Figure 2:
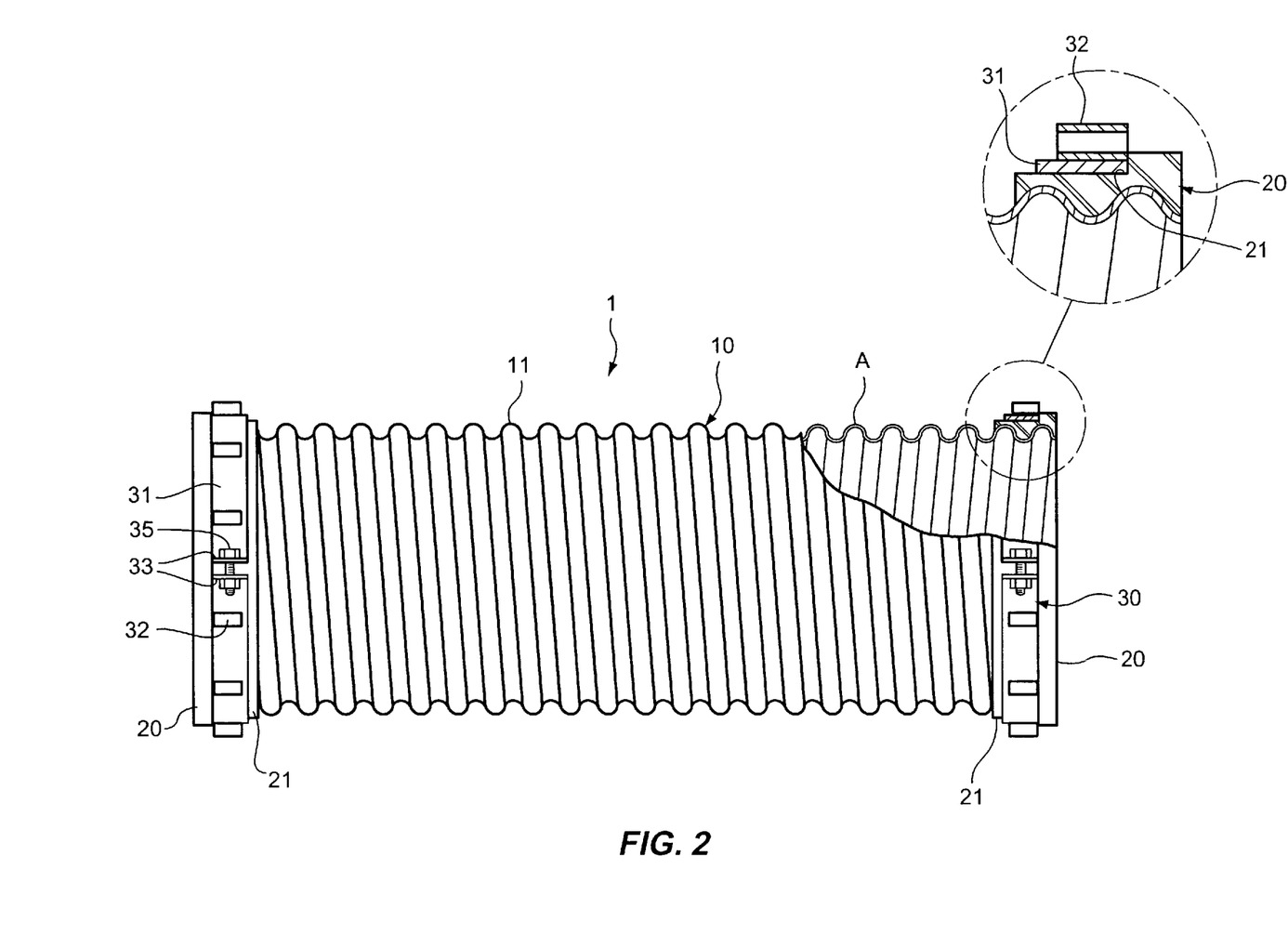
FIG. 2 is a front view of a spiral pipe having a sectionally cut portion.
Figure 3:
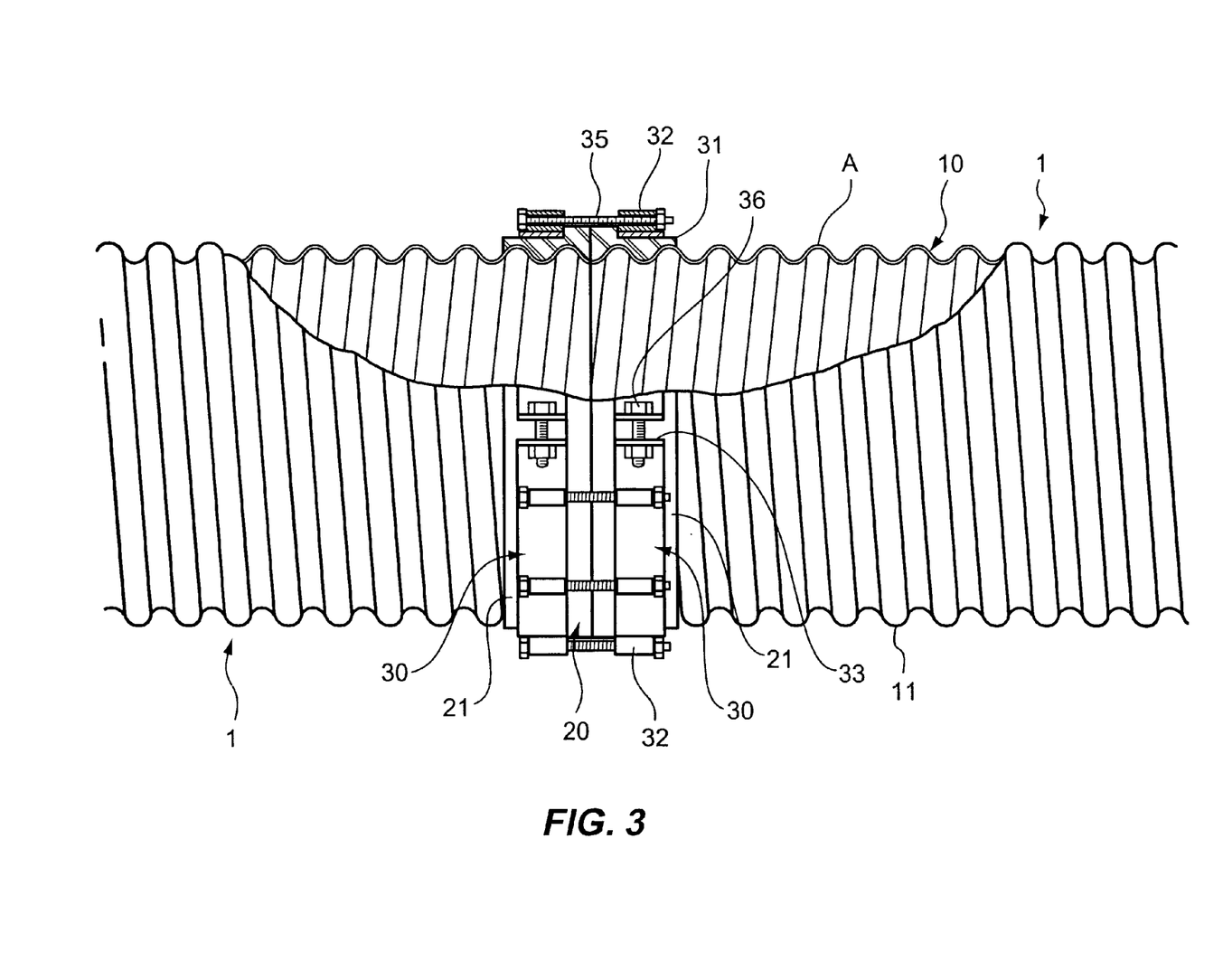
FIG. 3 is a front view of a spiral pipe showing a state that corrugated spiral pipes are connected with a binding band, having a sectionally cut portion.

A corrugated spiral pipe is composed of a pipe body 10 and a flange portion 20, in which the pipe body 10 has a cylindrical configuration and a spirally corrugated shape 11, and the flange 20 is formed in one body on the outer circumferential surface of both sides of the pipe body 10. That configuration as illustrated above is the same as that of a conventional spiral pipe. But, as shown in FIG. 1 and FIG. 2, a large outer diameter portion and a small outer diameter portion 21 are formed such that the end portion of the flange is higher than the inside portion thereof, and a binding band is installed on each small outer diameter portion 21 of the flange portion. The binding band 30 is a ring-shaped metallic belt plate 31 having a cut part at the center thereof and a plurality of the connecting ring are formed on the outer surface thereof and a bearing plate is formed on the cut part. Two corrugated spiral pipes are faced to each other, and a binding band 30 is installed on the small diameter portion 21 of a flange, and a bolt 35 is inserted axially through a connecting ring 32 of the binding band 30 and tightened by use of a nut, so that the flange portions 20 of the spiral pipes 1 are uniformly connected and pressed.

The present invention will be described with reference to the accompanying drawings.

Figure 4:
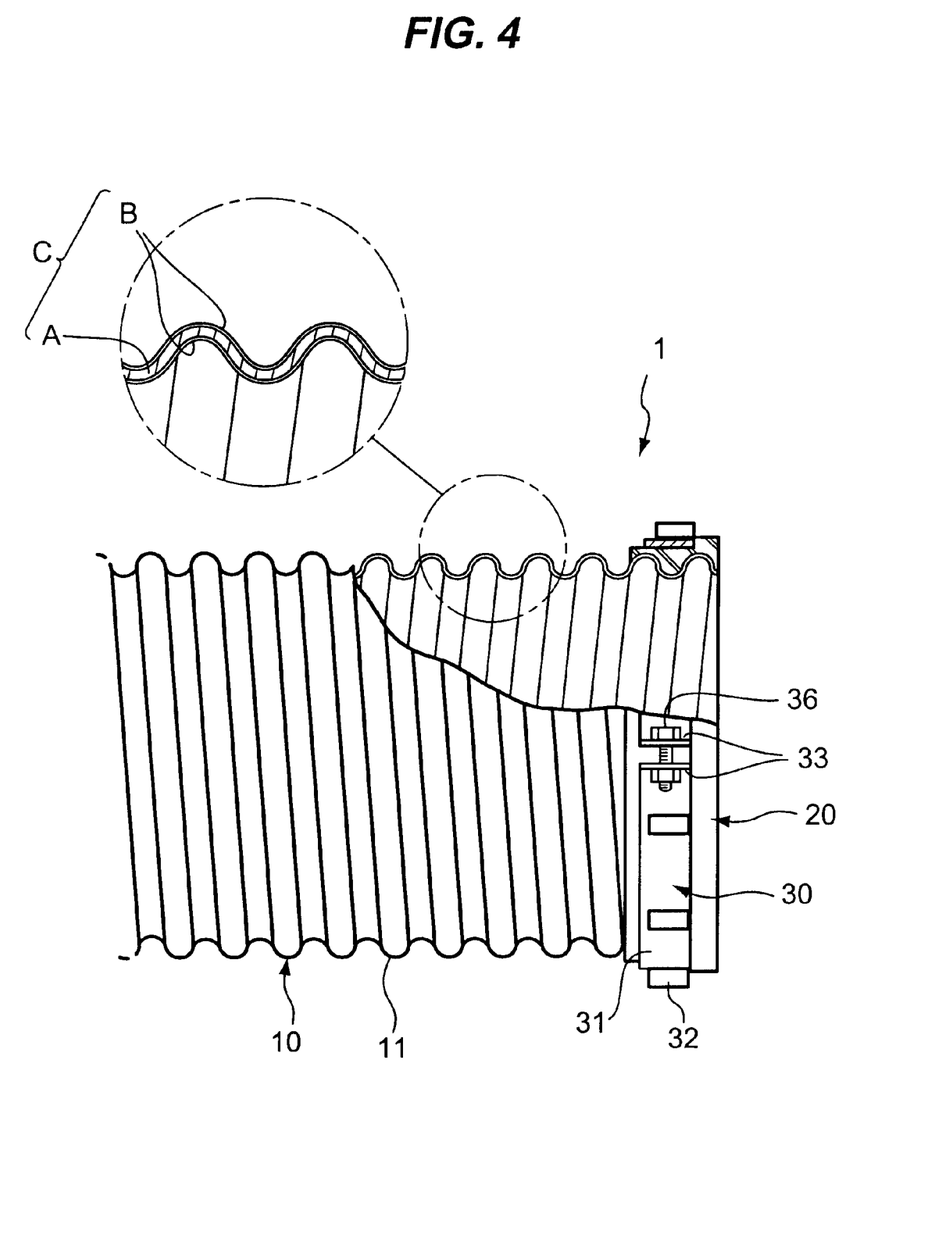
FIG. 4 is a front view of a spiral pipe in which the pipe wall is prepared with a coated steel plate.

A pipe body 10 is formed in cylindrical configuration and has a spirally corrugated shape. In the preferred embodiment of the present invention, a pipe wall of the pipe body 10 is prepared by winding spirally a corrugated steel plate A. Also, the pipe wall of the pipe body 10 as shown in FIG. 4 is prepared by use of a coated steel plate C which is coated with synthetic resin on the outer and inner sides thereof, so that a corrosion of the pipe body 10 can be prevented.

A flange portion 20 is formed as protruding at both sides end of the pipe body 10, and a synthetic resin is coated on the outer and inner sides thereof. After solidifying the synthetic resin, a cross-section of the flange is planed smoothly to form a rectangular shape. A binding band 30 is installed on the small outer diameter portion 21 which is formed such that the end portion of the flange 20 is higher than the inside portion thereof.

The outer diameter of the flange portion 20 is minimized up to the structural strength to be able to resist against impact or soil pressure, and a binding band 30 is installed on the small diameter portion 21 of the flange portion, in which a bolt is inserted into the connecting ring 32.

The binding band 30 is installed on the small diameter portion 21 of the flange portion 20, which makes the flanges fasten each other, so that the corrugated spiral pipes 1 are tightly connected.

The binding band 30 has a length to wind the perimeter of the small diameter portion 21 of the flange 20, and has a ring shape. Some part of the binding band is cut, and a plurality of the connecting rings 32 having a cylindrical shape is installed on the outer surface of the metallic belt plate 31 at specific intervals, and a bearing plate 33 having a hole 33a is formed vertically to both ends of the cut part of the metallic belt plate 31. A bold 36 is inserted through the hole 33a of the bearing plate 33, and then tightened with a nut, so that the binding band can be fixed onto the outer surface of the flange portion 20.

Figure 5A:
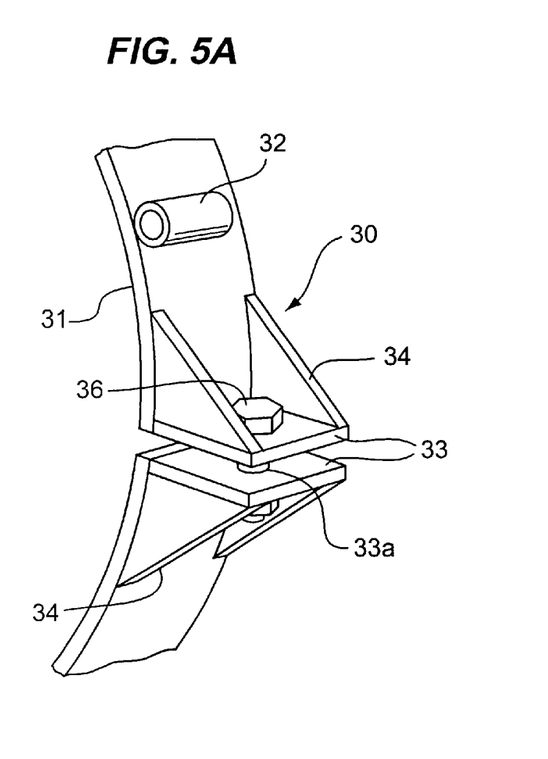
Figure 5B:
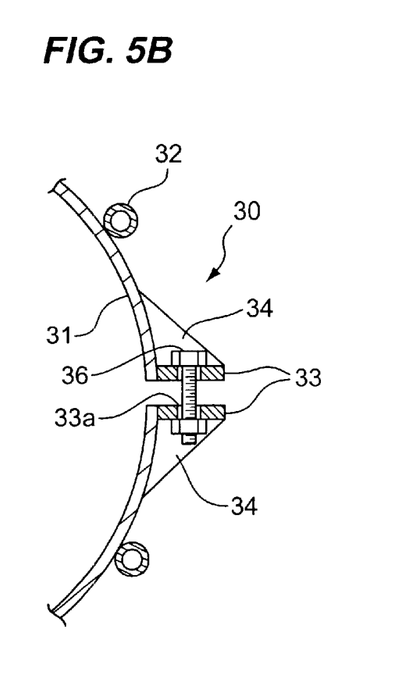
Figure 6A:
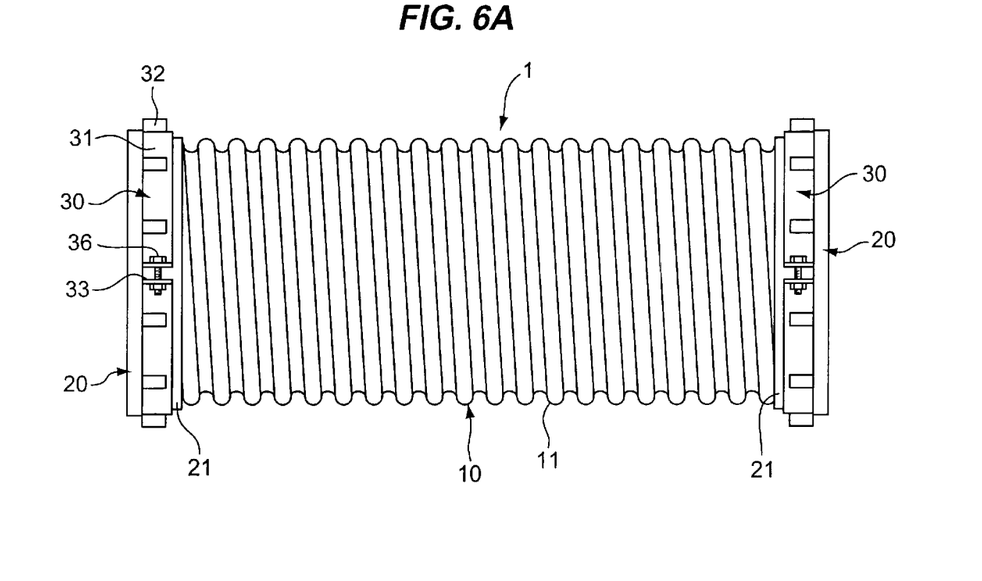
FIGS. 6a–d show a method for installing the corrugated spiral pipe according to the present invention.
Figure 6B:
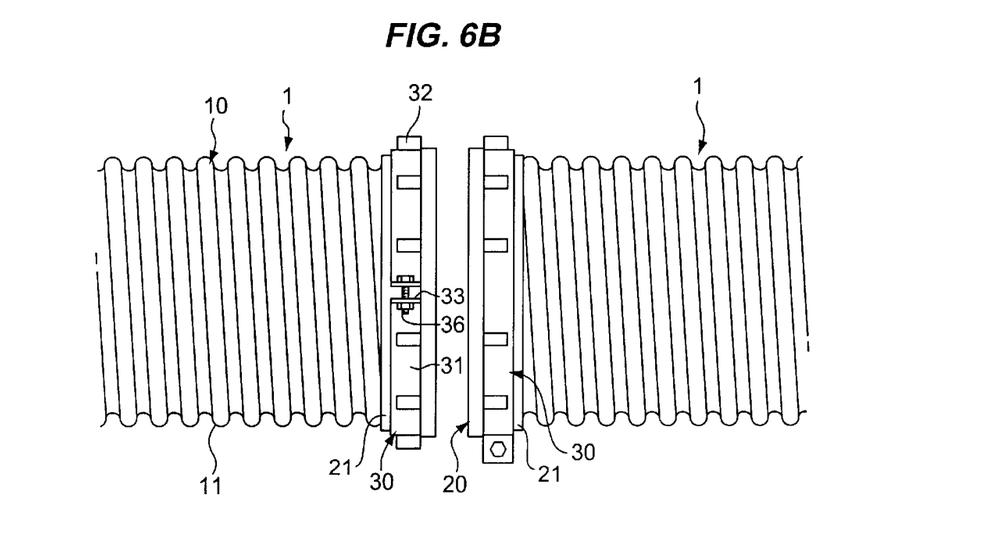
Figure 6C:
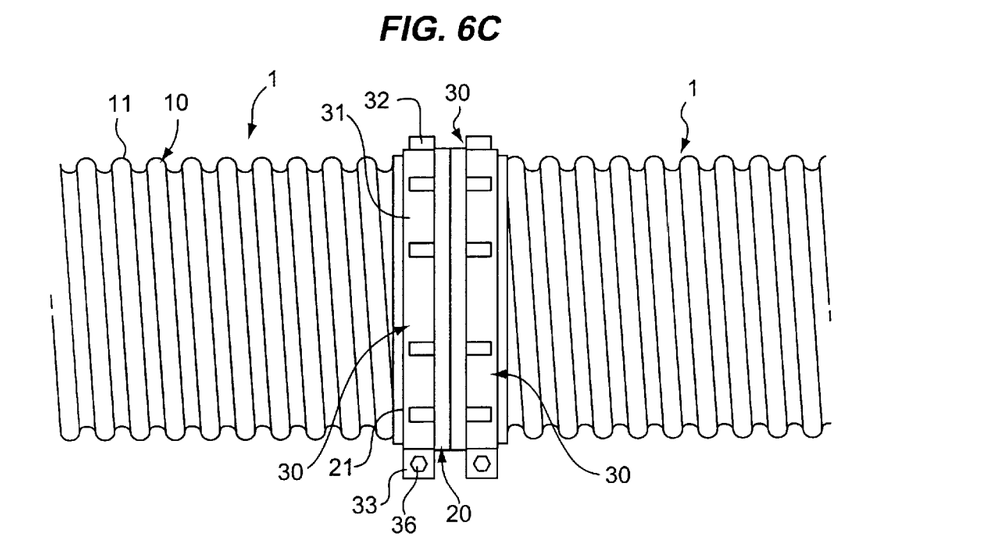
Figure 6D:
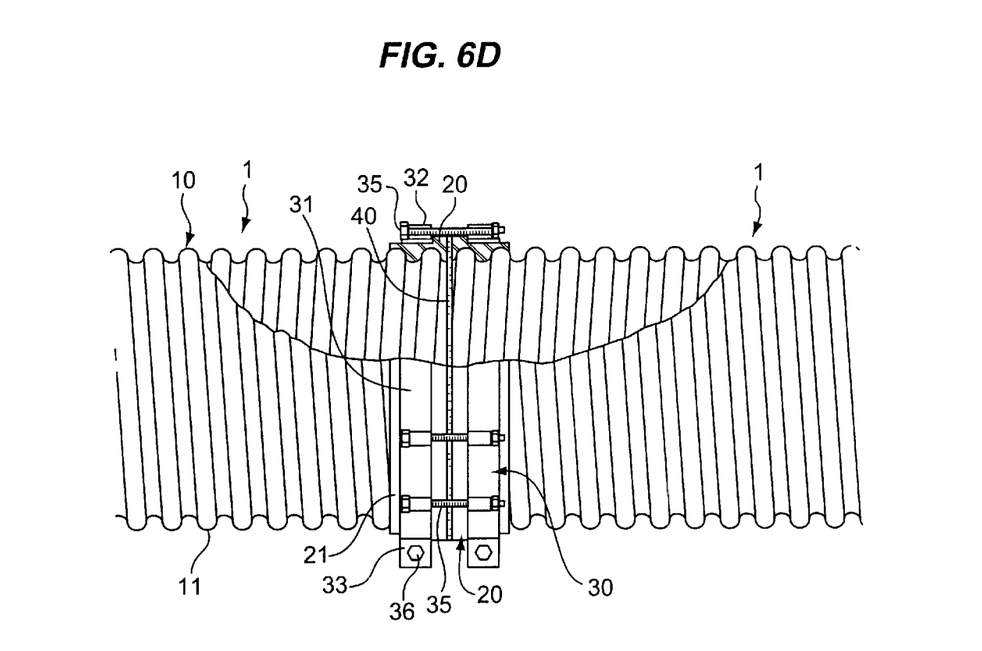

As shown in FIG. 5, it is desirable that a reinforcing plate 34 is installed between the bearing plate 33 and the metallic belt plate 30, so that the bearing plate 33 is firmly supported from a fastening force by bolt 36.

A method for installing a corrugated spiral pipe being equipped with a coupling device will be described with reference to FIG. 6. First of all, a binding band 30 is installed on a small outer diameter portion 21 of both sides of a corrugated spiral pipe 1 prior to moving it to the construction site, and thereafter the corrugated spiral pipe being equipped with the binding band is moved to the construction site and aligned in a row. The flange portion 20 of the two adjacent pipes 1 are placed to face, which are installed to align the connecting rings of each binding band 30. Bolts 35 are inserted through the connecting ring 32 of the binding band 30 of the installed two corrugated spiral pipes 1, followed by tightening the bolts with nuts. Above steps are repeated to connect a plurality of corrugated spiral pipes. Also, a packing 40 can be inserted between the flanges 20 of two spiral pipes to improve a water-tightness.

The present invention provides an excellent connection of corrugated spiral pipes by means of connecting the flange portion 20 formed at the pipe end of the pipe body 10 with a binding band 30, and the tightness of the bolt is uniform around the whole portion of the flange, so that the water-tightness of the connection portion is improved, and also the height of the flange portion is minimized to some degree, not to be deformed and damaged due to impact and load.

The present invention can be easily carried out by an ordinary skilled person in the art. Many modifications and changes may be deemed to be within he scope of the present invention as defined in the following claims.

What is claimed is:

1. A corrugated spiral pipe with a coupling device comprising a pipe body 10 which has a cylindrical spirally corrugated shape 11; a pair of flanges 20 which are formed in one body on outer circumferences of both end portions of said pipe body 10, each of the flanges 20 having a large outer diameter portion at an end portion of the flange 20 and a small outer diameter portion 21 at a longitudinally inside portion of the flange 20; and a pair of binding bands 30, each of said binding bands 30 being installed on the small outer diameter portion 21 of the flange 20 and being composed of a metallic belt plate 31 which has a ring configuration in which some part thereof is cut, a plurality of connecting rings 32 which are installed axially on an outer surface of the metallic belt plate 31 at specific intervals, and bearing plates 33 which are formed vertically to both end portions of the cut part of the metallic belt plate 31, each of the bearing plates 33 having a hole.

2. The corrugated spiral pipe as defined in claim 1, wherein said pipe body 10 is prepared by winding spirally a corrugated steel plate A.

3. The corrugated spiral pipe as defined in claim 1 or 2, wherein said pipe body 10 is prepared by using a coated steel plate C in which a synthetic resin B is coated on the outer and inner surfaces of a thin steel plate A.

4. The corrugated spiral pipe as defined in claim 1, wherein further includes a reinforcing plate 34 on both sides of bearing plate 33 of said binding band 30.

5. A coupling structure of two corrugated spiral pipes, each of said two corrugated spiral pipes 1 comprising a pipe body 10 which has a cylindrical spirally corrugated shape 11, a pair of flanges 20 which are formed in one body on outer circumferences of both end portions of said pipe body 10, each of the flanges 20 having a large outer diameter portion at an end portion of the flange 20 and a small outer diameter portion 21 at a longitudinally inside portion of the flange 20, and a pair of binding bands 30, each of said binding bands 30 being installed on the small outer diameter portion 21 of the flange 20 and being composed of a metallic belt plate 31 which has a ring configuration in which some part thereof is cut, a plurality of connecting rings 32 which are installed axially on an outer surface of the metallic belt plate 31 at specific intervals, and bearing plates 33 which are formed vertically to both end portions of the cut part of the metallic belt plate 31, each of the bearing plates 33 having a hole, wherein the adjacent flanges 20 of said two corrugated spiral pipes 1 are faced each other, and the connecting flanges 32 of said adjacent binding bands 30 of said two corrugated spiral pipes 1 are aligned, and bolts are inserted through the connecting rings 32 and nuts are used to tighten up.

* * * * *